(12) United States Patent
Everdahl (10) Patent No.: US 8,679,437 B2
(45) Date of Patent: Mar. 25, 2014

(54) PREPARATION OF MESOPOROUS AND MACROPOROUS SILICA GEL

(75) Inventor: Thomas Everdahl, Ishøj (DK)

(73) Assignee: FEF Chemicals A/S, Koege (DK)

( * ) Notice: Subject to any disclaimer, the term of this patent is extended or adjusted under 35 U.S.C. 154(b) by 0 days.

(21) Appl. No.: 13/497,720

(22) PCT Filed: Sep. 23, 2010

(86) PCT No.: PCT/EP2010/064034
§ 371 (c)(1),
(2), (4) Date: Jun. 19, 2012

(87) PCT Pub. No.: WO2011/036199
PCT Pub. Date: Mar. 31, 2011

(65) Prior Publication Data
US 2013/0011679 A1    Jan. 10, 2013

Related U.S. Application Data

(60) Provisional application No. 61/244,963, filed on Sep. 23, 2009.

(30) Foreign Application Priority Data

Sep. 23, 2009  (EP) .................................... 09171086

(51) Int. Cl.
*C01B 33/12* (2006.01)
(52) U.S. Cl.
USPC ..... 423/335; 423/338; 106/162.2; 106/177.1; 106/205.7; 106/205.72

(58) Field of Classification Search
None
See application file for complete search history.

(56) References Cited

U.S. PATENT DOCUMENTS

2006/0223965 A1 * 10/2006 Trifu ............................... 528/35
2010/0221542 A1    9/2010 Auger et al.

FOREIGN PATENT DOCUMENTS

| EP | 0537850 A1 | 4/1993 | |
| EP | 1887354 A1 | 2/2008 | |
| EP | 2031388 A1 | 3/2009 | |
| WO | 03/102001 A1 | 12/2003 | |
| WO | WO 2006128793 A1 * | 12/2006 | ................ C09C 1/30 |

OTHER PUBLICATIONS

Ikai T; Yamamoto C; Kamigaito M; Okamoto Y; "Organic-Inorganic Hybride Materials for Efficient Enantioseparation Using Cellulose 3,5-Dimethylphenylcarbamate and Tetraethyl Orthosilicate", Chemistry—AN Assian Journal, vol. 3, No. 8, Sep. 1, 2008; pp. 1494-1499; XP002561936.

(Continued)

Primary Examiner — Melvin C Mayes
Assistant Examiner — Smita Patel
(74) Attorney, Agent, or Firm — Duane Morris LLP; Nicholas A. Zachariades (57) ABSTRACT

The present application discloses a process for preparing silica particles, said process comprising the step of mixing (I) an aqueous phase and (II) an oily phase comprising pre-polymerized tetraalkoxy orthosilicate, one or more alcohols, and optionally one or more polyalkylene glycols, wherein said aqueous phase comprises, in an aqueous solvent, one or more $C_{6-30}$-alkyl modified polysaccharides, and optionally one or more polyalkylene glycols.

6 Claims, 4 Drawing Sheets

(56) References Cited

OTHER PUBLICATIONS

Hohenesche C. D. F. V. et al., "Development of Standard Operation Procedures for the Manufacture of N-Octadecyl Bonded Silicas as Packing Material in Certified Reference Columns for Reversed-Phase Liquid Chromatography", Journal of Chromatography, STN, Inst. Biol. Chem. Acad. Sin., Taipei, Taiwan; vol. 1025, No. 2, Feb. 6, 2004, pp. 177-187, CP004482095.

Patent Cooperation Treaty, "International Search Report" by Authorized Officer Isabelle Charles; ISA/EP, pp. 1-7; mailed Feb. 28, 2011.
Patent Cooperation Treaty, "International Preliminary Report on Patentability" by Authorized Officer Yolaine Cussac from The International Bureau of WIPO; pp. 1-12; mailed Apr. 5, 2012.
C.V. Stevens et al., "Polymeric Surfactants Based on Inuiln, a Polysaccharide Extracted from Chicory. 1. Synthesis and Interfacial Properties", biomacromolecules 2001, 2; pp. 1256-1259.

* cited by examiner

PREPARATION OF MESOPOROUS AND MACROPOROUS SILICA GEL

CROSS-REFERENCE TO RELATED APPLICATIONS

This application is a §371 national stage entry of International Application No. PCT/EP2010/064034, filed Sep. 23, 2010, which claims priority to European Patent Application No. EP 09171086.3 filed Sep. 23, 2009 and U.S. Provisional Application No. 61/244,963 filed Sep. 23, 2009, the entire contents of which are incorporated herein by reference.

FIELD OF THE INVENTION

The present invention relates to a novel method for the preparation of mesoporous and macroporous silica gel in which process a modified polysaccharide is utilized.

BACKGROUND OF THE INVENTION

When preparing silica gel it is common to use a structure directing agent in the form of a cationic surfactant and a ripening control substance such as N,N-dimethyl formamide. The problem of using a cationic surfactant is that it acts both as emulsifier and as structure template, thereby making it difficult to control the pore size while controlling particle size. The present invention describes a method for preparing spherical silica particles without the use of a cationic surfactant and the toxic substance N,N-dimethyl formamide.

The present invention is based on further development of the method for preparation of silica gel in "Development of standard operation procedures for the manufacture of n-octadecyl bonded silicas as packing material in certified reference columns for reversed-phase liquid chromatography" by C. du Fresne von Hohenesche, V. Ehwald, K. K. Unger, *J. Chromatogr. A* 1025 (2004) 177-187.

WO 2003/102001 A1 discloses polyol-modified silanes as precursors for silica. Ikai et al., Chem. Asian J. 2008, 3, 1494-1499, and EP 1 887 354A1 disclose beads for optical-isomer resolution and a process for producing the same. EP 2 031 388 A1 discloses fillers for optical isomer separation. US 2010/0221542 discloses a process for preparing a porous silica particle using a water-soluble pore-forming agent.

When preparing the silica particles it is necessary to ensure that the pore size and pore volume is controlled, as these parameters have a great impact on the usability of the silica gel, especially when the particles are used as chromatographic media. The pore structure is traditionally controlled by adding drying control agents such as the toxic N,N-dimethyl formamide. Also the particle size distribution in the emulsion is important, as this determines the yield of the process. This is because most in most applications of macroporous silica particles only a certain particle size fraction can be used. Typically the desired particle size fraction is obtained by sieving or cyclone fractionation. Moreover, it is important to prepare mechanically robust particles, in particular for the purpose of HPLC applications, and thereby suppress the breakage of particles in the preparation process and upon use.

Hence, there is a need for a better process for preparing macroporous silica particles, said process reducing or eliminating the need for toxic agents and increasing the yield and quality of the final sieved product.

SUMMARY OF THE INVENTION

It has been found by the present inventor(s) that by utilizing $C_{6-30}$-alkyl modified polysaccharides, it is possible to obtain an improved control of the emulsion in the process of preparing macroporous silica particles.

Hence, the present invention relates to a process for preparing silica particles, said process comprising the step of mixing
(i) an aqueous phase and
(ii) an oily phase comprising pre-polymerized tetraalkoxy orthosilicate, one or more alcohols, and optionally one or more polyalkylene glycols,
wherein said aqueous phase comprises, in an aqueous solvent, one or more $C_{6-30}$-alkyl modified polysaccharides, and optionally one or more polyalkylene glycols.

The invention further provides populations of spherical silica particles.

DETAILED DISCLOSURE OF THE INVENTION

The present invention uses dispersion polymerisation to obtain spherical silica particles. It has surprisingly been found that addition of modified polysaccharide result in a more robust process and a narrower particle size distribution than obtained by prior art methods. Moreover, the resulting silica particles appear to have a higher mechanical strength. The present invention eliminates the need for N,N-dimethyl formamide and uses a modified polysaccharide to control the particle size distribution of the product thereby increasing the yield. In one aspect of the present invention the pore size distribution is further controlled by adding polyethylene glycol to the dispersed and/or the continuous phase of the dispersion.

The use of modified polysaccharide ensures that the emulsion is stable for several hours thereby making it easier to handle in the process.

The process according to the present invention enables controlling the pore size distribution over a broader range than possible with prior art processes. In particular, it enables synthesis of particles with extremely high pore volumes.

In the present context, the term "$C_{6-30}$-alkyl modified polysaccharide" is intended to mean a polysaccharide having covalently linked thereto one or more $C_{6-30}$-alkyl moieties. Such moieties may be linked via ester groups, ether groups, amide groups, carbamate groups, and the like. It should be understood that apart from the linker connecting the $C_{5-30}$-alkyl moiety to the polysaccharide, the alkyl moiety is preferably devoid of any heteroatoms.

The $C_{6-30}$-alkyl moieties include straight chain or branched alkyl moieties having 6 to 30 carbon atoms, and may cyclic portions, e.g. cyclohexyl portions, as well as unsaturated bonds (i.e. in fact "alkenyl", "alkadienyl", "alkynyl", etc.). Particularly interesting are straight chain or branched alkyl moieties having 6 to 30 carbon atoms ($C_{6-30}$-alkyl moieties), in particular $C_{8-24}$-alkyl moieties, such as $C_{10-16}$-alkyl moieties.

The polysaccharide may be any one including 5-250 sugar moieties, such as 10-100 sugar moieties, e.g. alginate, carrageenan, xanthan, cellulose, chitosan and inulin. In one currently preferred embodiment, the polysaccharide is inulin.

Some interesting modifications are those where the polysaccharide is modified as the $C_{8-24}$-alkyl carbamates, e.g. the lauryl carbamate.

A class of currently very interesting modified polysaccharides is inulin $C_{8-24}$-alkyl carbamates, e.g. inulin lauryl carbamate.

Another class of currently very interesting modified polysaccharides is cellulose $C_{8-24}$-alkyl carbamates, e.g. cellulose lauryl carbamate.

Carbamates of polysaccharides may be prepared according to the procedures described in Stevens et al., Biomacromolecules 2001, 2, 1256-1259, or may be obtained from commercial sources.

In the process according to the invention, an aqueous phase is mixed with an oily phase, The Aqueous Phase The aqueous phase in prepared by dissolving the modified polysaccharide(s) and any polyalkylene glycol in an aqueous solvent. The preparation is typically conducted at ambient temperature, e.g. 10-30° C., such as around 20° C.

In the present context, the term "aqueous solvent" is intended to encompass solvents in which the predominant portion (by weight), i.e. more than 50% (w/w) is constituted by water. Such aqueous solvents typically includes one or more alcohols (including combinations thereof), e.g. those selected from methanol, ethanol, 1-propanol, 2-propanol, 1-butanol, 2-butanol, 1,2-ethane dial, 1,3-propane diol, and 1,2,3-propane triol. In preferred embodiments, the alcohol or alcohols are selected from methanol, ethanol, propanol, isopropyl alcohol, 1,2-ethane diol, 1,3-propane diol, and 1,2,3-propane triol, or even more preferably from ethanol, 1-propanol, 2-propanol, 1,2-ethane diol, 1,3-propane did, and 1,2,3-propane triol. Alcohols in the context of the "aqueous solvent" are not intended to encompass polyalkylene glycols (see further below).

Preferably, water constitutes 70-100% (w/w), e.g. 70-99% (w/w), of the aqueous solvent, such as 80-98% (w/w) of the aqueous solvent, in particular 15-97% (w/w) of the aqueous solvent.

In preferred variants, water and the one or more alcohols constitutes at least 98% (w/w) of the aqueous solvent, in particular at least 99% (w/w), and even more preferably at least 99.9% (w/w), such as 100% (w/w), of the aqueous solvent.

In some embodiments, the aqueous phase is prepared including the modified polysaccharide (e.g. inulin $C_{8-24}$-alkyl carbamate) in a concentration in the range of 0.01-10% (w/w), preferably in the range of 0.01-5% (w/w), even more preferably in the range of 0.01-2% (w/w).

It has been found that it may be advantageous to include one or more polyalkylene glycols in the aqueous phase and/or in the oily phase. Polyalkylene glycols are typically selected from polyethylene glycols and polypropylene glycols, and modified variants hereof, e.g. polyoxyethylene lauryl ether, polyoxyethylene oleyl ether, polyoxyethylene cetyl ether, etc., e.g. those known under the tradenames Brij 30, Brij 92, etc.

Typically, the weight average molecular weight of such polyalkylene glycols is 200-3000 g/mol, such as 200-2000 g/mol, and preferably 200-1000 g/mol.

The polyalkylene glycols, when present, typically represents 0.1-30% (w/w), such as 0.2-20% (w/w) of the aqueous phase.

Preferably, the aqueous phase is essentially devoid of N,N-dimethyl formamide.

The Oily Phase

The oily phase comprises as an essential constituent pre-polymerized tetraalkoxy orthosilicate. This constituent of the oily phase is typically prepared by reacting the corresponding tetraalkoxy orthosilicates in an alcohol (preferably corresponding to the alkoxy groups of the orthosilicate) in the presence of an acid. Typical alcohols are those selected from $C_{1-3}$-alcohols, such as methanol and ethanol, in particular ethanol.

The pre-polymerized alkoxysiloxane (in particular ethoxysiloxane/ethyl silicate) is typically stirred with an alcohol (typically ethanol) in a weight ratio of siloxane to alcohol of 10:1 to 3:1.

In some embodiments, one or more polyalkylene glycols (see those specified above, e.g. polyethylene glycol) of an average molecular weight of 100-1000 g/mol are added in a weight ratio of siloxane to polyalkylene glycol of 1:30 to 1:5. In addition hereto or as alternatives, it may be desirable to add other similar ingredients such as polysaccharides (e.g. inulin, cellulose or other polyols) as well as chemically modified nanotubes so as to obtain a narrower pore size distribution in the final product.

An aqueous solution of a suitable acid (in particular HCl) is added to the alcoholic solution of the pre-polymerized alkoxysiloxane. Stirring is continued, suitable for 10-120 minutes, such as approximately 30 minutes. After the pre-polymerization step using an acid, excess alcohol is advantageously removed. Hence, the mixture is processed on a rotary evaporator to eliminate water and ethanol, e.g. by heating the mixture to 40-150° C. for 60-300 minutes and applying a reduced pressure, e.g. of 250-600 mbar.

Some qualities of such pre-polymerized tetraalkoxy orthosilicates are commercially available, such as the TES 40 from Wacker Chemie AG (a pre-polymerized tetraethoxy orthosilicate), Ethyl silicate 28, Ethyl silicate 32, etc.

The tetraalkoxy orthosilicates useful for the pre-polymerized products are typically the tetramethoxy orthosilicate, the tetraethoxy orthosilicate, and the tetrapropoxy orthosilicate, among which the tetraethoxy orthosilicate normally is the preferred choice.

To the extent that the commercially available qualities of pre-polymerized tetraalkoxy orthosilicates have a too low degree of pre-polymerisation (e.g. is not sufficiently viscous), it may be advantageous to further pre-polymerized such products by further treatment with an acid in a suitable alcohol. Also, if a pre-polymerized tetraalkoxy orthosilicate is too viscous, it may be advantageous to mix it with a less viscous quality of the pre-polymerized product. These options will be apparent from the examples.

It is believed that the silicon content ($SiO_2$) of the pre-polymerized tetraalkoxy orthosilicate preferably is in the range of 32-75% (w/w), such as 50-65% (w/w).

A suitable pre-polymerized tetraalkoxy orthosilicate in the form of a siloxane oil of suitable viscosity is thereby obtained.

Subsequently, the preparation of the oily phase is completed by mixing the siloxane oil with one or more $C_{4-8}$-alcohols, e.g. those selected from 1-butanol, 2-butanol, 1-pentanol, 2-pentanol, 1-hexanol, 2-hexanol, 3-hexanol, and cyclohexanol.

In certain variants, the pre-polymerized tetraalkoxy orthosilicate is added so as to constitute 1-60% (w/w), in particular 2-40% (w/w), of the oily phase. The one or more $C_{4-8}$-alcohols are added so as to constitute 0-20% (w/w), in particular 1-10% (w/w), of the oily phase.

In some variants, the oily phase comprises one or more alcohol ethers, e.g. selected from diethylene glycol diethyl ether, diethylene glycol ethyl ether, diethylene glycol dipropyl ether, diethylene glycol propyl ether, diethylene glycol dibutyl ether, diethylene glycol butyl ether, propylene glycol diethyl ether, propylene glycol ethyl ether, propylene glycol dipropyl ether, propylene glycol propyl ether, propylene glycol dibutyl ether, and propylene glycol butyl ether.

As mentioned above, it has been found advantageous to include one or more polyalkylene glycols in the aqueous phase and/or in the oily phase. Hence, one or more polyalkylene-glycols may be added to the oily phase. The polyalkyleneglycols are typically selected among those specified above for the aqueous phase.

The polyalkylene glycols, when present, typically represents 0.1-30% (w/w), such as 0.2-20% (w/w) of the oily phase.

In one embodiment of the present invention polyethylene glycol (PEG) is added to the aqueous phase and/or the oily phase. By varying the amount of PEG in the two phases the pore volume can be controlled over a wide range. An interesting range of pore volumes obtainable by the process of the invention is 0.5-2.5 cm$^3$/g.

Moreover, the oily phase may comprise one or more additional constituents in an amount of up to 2% (w/w) of the oily phase. Such constituents include other surfactants, dyes, colorants, etc.

In one embodiment, the oily phase comprises 5-45% (w/w) of the pre-polymerized tetraalkoxy orthosilicate (in particular tetraethoxy orthosilicate), 20-40% (w/w) of one or more $C_{4-8}$-alcohols, optionally 0.2-20% (w/w) of the one or more polyalkylene glycols, and optionally up to 2% (w/w) of one or more additional constituents.

Preparation of the Emulsion

In the further process, an emulsion including the aqueous phase and the oily phase (cf. the disclosure above) is prepared by mixing the oily phase with the aqueous phase and emulsifying the mixture by suitable means.

The aqueous phase and the oily phase are typically mixed in a weight ratio of from 10:1 to 1:2.5, such as from 5:1 to 1:1.5.

In some interesting embodiments, the aqueous phase is mixed with the oily phase by using an inline mixer and circulating the mixture in the batch chamber preferably for 1 to 90 minutes, more preferably for 2 to 60 minutes, even more preferably for 4 to 40 minutes. Under these conditions, the emulsion is formed.

The emulsion is then ripened by stirring the mixture for 0 to 90 minutes, preferably for 10 to 60 minutes, even more preferably for 20 to 40 minutes. The stirring is required so as to avoid separation of the emulsion into the aqueous phase and the oily phase.

Preparation of a Xerogel

The ripened emulsion is subsequently contacted with a base causing the spherical oil droplets to polymerize and harden. This is typically effected by using conventional techniques.

The base is typically selected from aqueous ammonia solutions (e.g. 0.1-25%, such as 1-20%, in particular 2-15%), primary aliphatic amines (e.g. $C_{1-12}$-alkylamines, such as $C_{1-8}$-alkyl amines, in particular $C_{1-8}$-alkylamines), cyclic (e.g. pyrrolidine and hexamethylene tetraamine) and aromatic amines. Particularly interesting bases are those selected from 1-20% aqueous ammonia solutions and $C_{1-8}$-alkyl amines, in particular 2-15% aqueous ammonia solutions and $C_{1-4}$-alkylamines. The amines may contain one or more —OH groups, one or more —COOH groups or one or more —CN groups.

The treatment with the base is typically conducted for 1 to 90 minutes, more preferably for 10 to 60 minutes, even more preferably for 20 to 40 minutes.

The solution is then typically heated to 50° C.-100° C. for a period of 30 minutes to 8 hours to ensure a narrow pore size distribution. Finally, the particles are washed with water and dried.

Calcination of the Xerogel Particles:

The particles are heated to more than 550° C. e.g. with 1° C./min and calcinated at more than 550° C. for 3 to 10 hours. The particles are then cooled to room temperature over a period of approximately 20 hours.

The particles are preferably heated to more than 550° C. e.g. with 1° C./min and calcinated at more than 550° C. for preferably 3 to 10 hours. More preferably the particles are heated to more than 600° C. e.g. with 1° C./min and calcinated at more than 600° C. for preferably 3 to 10 hours. Even more preferably the particles heated to more than 650° C. e.g. with 1° C./min and calcinated at more than 650° C. for preferably 3 to 10 hours.

The particles are then cooled to room temperature over a period of approximately 20 hours.

After calcination, the particles may be sieved and the pores may be extended according to conventional techniques.

Novel Silica Particles

Figure 2:
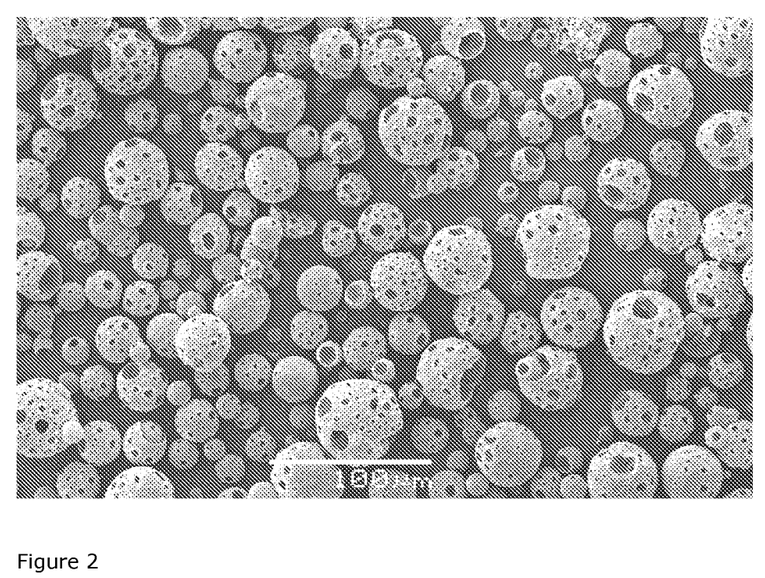
FIG. 2 shows the porous silica particles obtained in Example 2.
Figure 6:
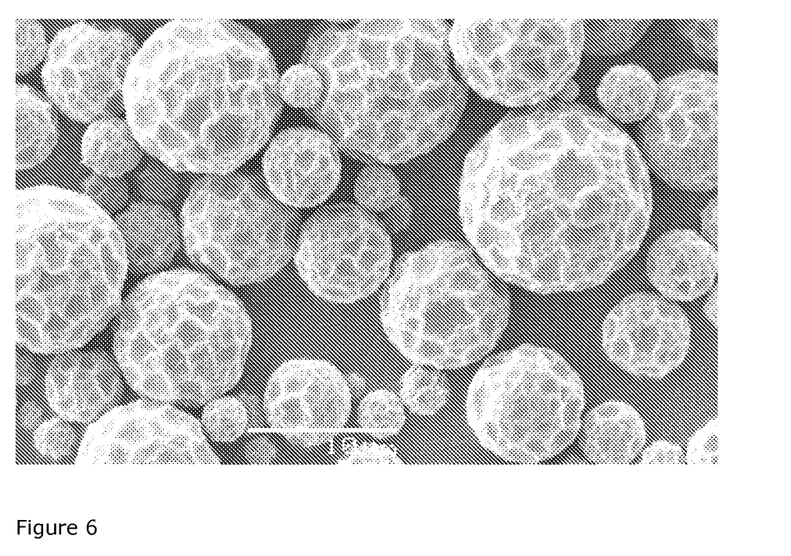
FIG. 6 shows the porous silica particles obtained in Example 7.
Figure 8:
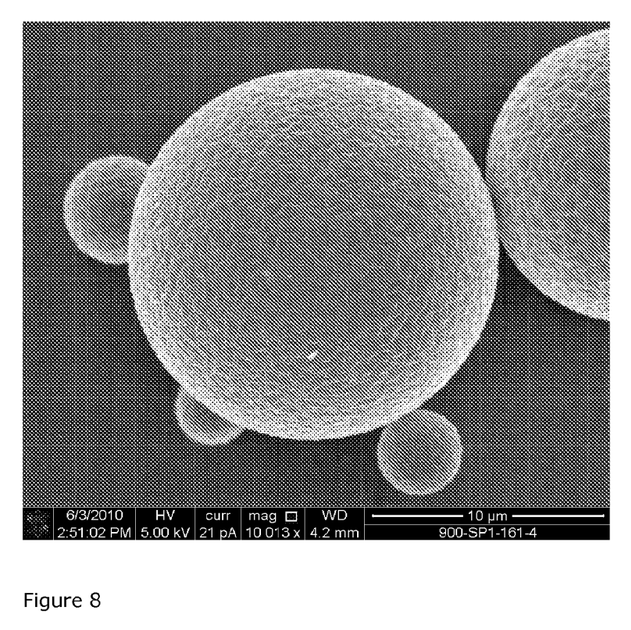
FIG. 8 shows the porous silica particles obtained in Example 8.

The process according to the invention provides in some embodiments, see in particular Examples 2, 7 and 8, classes of substantially spherical silica particles with novel structural features, see e.g. FIGS. 2, 6 and 8.

One common feature of the various classes of novel spherical silica particles is a surface area of 100-600 m$^2$/g. In some variant, the surface area is in the range of 200-500 m$^2$/g Populations of the novel spherical silica particles typically have a mean particle size of 2-500 μm, such as 10-100 μm.

One class of novel spherical silica particles are further characterized by a "raisin-like" surface structure, i.e. a surface structure having a wrinkled surface with ridges and valleys. Such particles are illustrated in FIGS. 6 and 8.

Alternatively, or a supplement, the surface structure may be described by a relatively high degree of surface roughness of the particles, i.e. that the mean surface roughness determined in accordance with the method described in the Experimentals section is at least 0.1 μm, e.g. in the range of 0.1-1.0 μm, such as in the range of 0.12-0.6 μm, or in the range of 0.15-0.5 μm.

As a further alternative, the surface structure can be described as that of a collapsed skin layer of an (theoretical) sphere having a diameter of at least 1.02 times the diameter of the spherical silica particle, such as 1.05-3.0 times, or even 1.07-2.0 times the diameter of the spherical silica particle. With reference to the method for determining the mean surface roughness, this factor may be determined by comparing the mean diameter of the two circles/arches fitted on the SEM image with the "diameter" of the theoretical sphere measured (using increments of 1/20 of the approximate particle diameter) as the length of the irregular curve representing the surface divided by 3.1415 (pi).

The present invention also provide another class of spherical silica particles, namely those having a pore volume of 3-10 cm$^3$/g, such as 5-10 cm$^3$/g, in particular 7-10 cm$^3$/g, and a surface area of 100-600 m²/g, such as 200-500 m²/g, in particular 300-500 m²/g. Such particles are illustrated in FIG. 2.

The surface area, the mean particle size and the pore volume of the silica particles prepared herein are determined as described in the Experimentals section.

The invention further relates to silylated silica particles wherein the silica particles prepared herein, including the novel classes of spherical silica particles, are modified by reaction with a silane of the formula Cl—SiR$_2$R*, wherein each of R independently is a C$_{1-4}$-alkyl group, such as methyl, ethyl, 1-propyl, 2-propyl, 1-butyl, 2-butyl, tert-butyl, and wherein R* is a C$_{4-30}$-alkyl group, such as a straight chain alkyl group, e.g. C$_8$-alkyl (octyl), decyl, dodecyl, octadecyl (C$_{18}$-alkyl), etc. The method described in the Experimentals section for silylation of silica particles is one possible method for preparing the silylated silica particles.

The resulting silylated silica particles thus carry groups of the formula —SiR$_2$R*. The R* group in particular provides hydrophobic properties to the silica particle.

Use of Silica Particles

The thus prepared silica particles, including the novel spherical silica particles and silylated silica particles, may, e.g., be useful for HPLC applications where silylated (bonded) silica particles can be used to purify small molecules, peptides or proteins.

EXPERIMENTALS

Materials
Inulin polymer: Inutec SP1 (42004021) from Orafti Oreye
TES 40: pre-polymerized tetraethoxy orthosilicate from Wacker Chemie AG
Brij 30: Polyoxyethylene (4) Lauryl Ether from Sigma Aldrich
Lutensol TO2: C13 alcohol polyethoxylate from BTC Speciality Chemical Distribution A/S
Lutensol XP30: C10 alcohol polyethylene glycol from BTC Speciality Chemical Distribution WS
Determination of Surface Area of the Silica Particles The surface area, pore volume and average pore diameter is measured by nitrogen adsorption unless specified otherwise. The nitrogen adsorption method is known as BET and is described in S. Brunauer, P. H. Emmett and E. Teller, *J. Am. Chem. Soc.*, 1938, 60, 309.

Alternatively, the surface area is determined using the Hg intrusion porosimetry as described in E. W. Washburn, Proc. Nat. Acad. Sci., 7, 115 (1921) and H. L. Ritter and L. C. Drake, Pore-Size Distribution in Porous Materials, Industrial and Engineering Chemistry, 17, 782 (1945).

Determination or the Mean Particle Size of the Silica Particles

The mean particle size and particle size distribution is measured by micro flow imaging using a DPA 4100 apparatus from Brightwell Technologies Inc. Micro flow imaging operates by capturing images from the sample as it passes through a flow cell's sensing zone. Every particle in each image is analyzed by size.

Determination of Mean Surface Roughness of Spherical Silica Particles

Silica particles for roughness measurement is placed on carbon tape and coated with a 10 nm layer of Ir to make the surface conductive. To protect the surface in the cross section area, Pt is deposited. The first deposition layer is made by using the electron beam, to make it as sensitive as possible to the surface. The conditions for the E-beam deposition are 1 kV, 2.7 nA and the layer is approximately 200 nm. The second deposition layer is made by the ion source to make the layer thick enough for ion milling. The conditions for the I-beam deposition are 30 kV, 93 pA and the layer is approximately 1 µm. Due to the spherical surface of the particles, the layer is not evenly distributed on the whole surface.

The conditions for the cross sectioning using the focus ion beam is 30 kV and currents from 2.8 nA to 48 pA. The high currents are used for the rough cut, and the lower currents are used for polishing the surface of the cross section before imaging. During the process a XeF$_2$ gas is used to prevent redeposition. During the whole process the microscope is mounted with a cryo can to prevent redeposition. The instrument used in this experiment is a Helios NanoLab 600 with a focused ion beam of Gallium ions.

Figure 7:
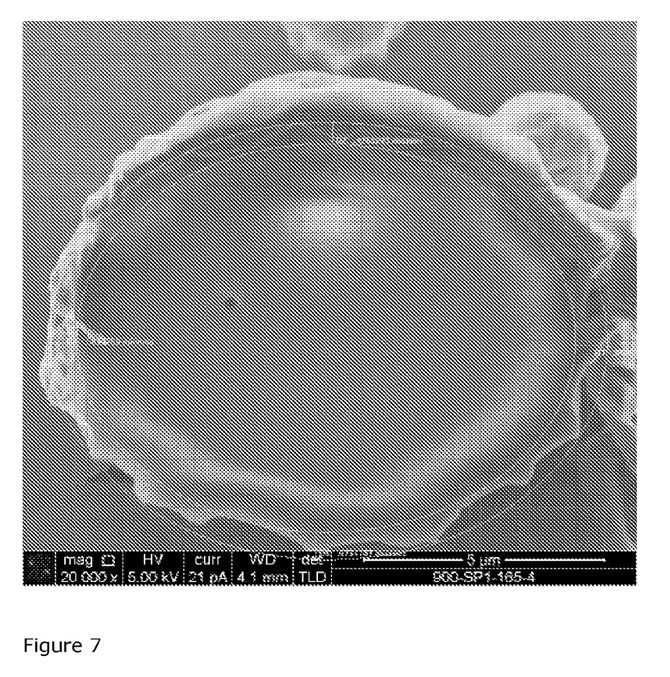
FIG. 7 illustrates the method for determining the mean surface roughness of the particles obtained in Example 7.

Roughness is measured by creating best fit arches or best fit circles on the on the 2D surface profile revealed from the cross section in the SEM image. One arc is fitted through the valleys of the surface and one arch or circle is fitted through the top of the surface (see, e.g., FIG. 7). This is performed on 5 profile elements and the peak-to-valley distance between the two arcs is measured. The roughness is calculated as the mean height of 5 profile elements. A profile element is defined in accordance with ISO4287:1997 as a profile peak and the adjacent profile valley.

Silylation of Silica Particles

The silica particles disclose herein may be silylated in accordance with the Standard Operation Procedure discloses in C. du Fresne von Hohenesche et al., J. Chromatogr. A, 1025 (2004) 177-187, section 2.6 "SOP for the silanisation of silica xerogel beads".

Example 1

Preparation of Porous Silica Particles

Preparation of the Aqueous Phase:
33 g Inulin-polymer was dissolved in 5775 g water at room temperature. 825 g isopropanol was added.

Preparation of the oily phase: 672 g Ethanol was added to 3120 g TES 40 and stirred at room temperature. 146 mL 0.1N HCl was added to the mixture over a period of 10 minutes. The mixture was stirred for an additional 30 minutes. The mixture was heated in an oil bath (140° C.) and evacuated to 400 mbar for 150 minutes. After cooling to room temperature, 500 g TES 40 was added together with 120 g 1-hexanol and 5 g Brij 30.

Preparation of the emulsion: The aqueous phase and the oily phase were mixed for 20 minutes at room temperature and the stirred for another 30 minutes at room temperature. The emulsion was then contacted with 420 mL 10% ammonium hydroxide. The mixture was stirred for another 30 minutes where after it was heated to 80° C. for 4 hours.

Preparation of the xerogel: The particles were washed with water and heated to 150° C. and dried followed by heating to 650° C. with 1° C./min. and then calcinated at 650° C. for 6 hours. The particles were then cooled to 20° C. over 20 hours.

Figure 1:
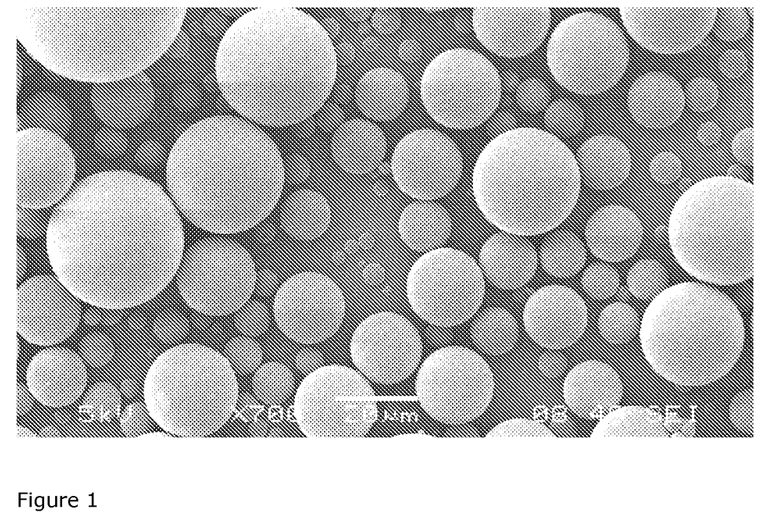
FIG. 1 shows the porous silica particles obtained in Example 1.

The particles obtained had an average pore size of 90 Ångstrøm, a surface area of 400 m²/g measured by the nitrogen adsorption method, and a pore volume of 0.90 cm³/g. The resulting particles are shown in FIG. 1

Example 2

Preparation of Highly Porous Silica Particle

Preparation of the aqueous phase: 30 g Inulin-polymer was dissolved in 3000 g water at room temperature.

Preparation of the oily phase: 672 g Ethanol was added to 3120 g TES 40 and stirred at room temperature. 146 mL 0.1N HCl was added to the mixture over a period of 10 minutes. The mixture was stirred for an additional 30 minutes at room temperature. The mixture was heated in an oil bath 140° C. and evacuated to 400 mbar for 150 minutes. After cooling to room temperature, 400 g of this oil was added 80 g of polyethylene glycol ($M_w$ 3350) and mixed.

Preparation of the emulsion: The aqueous phase and the oily phase were mixed for 4 minutes at room temperature and then stirred for another 30 minutes. The emulsion was then contacted with 20 mL 25% ammonium hydroxide.

Preparation of the xerogel: The particles were washed with water and heated to 150° C. and dried followed by heating to 650° C. with 1° C./min. and the calcinated at 650° C. for 6 hours. The particles were then cooled to 20° C. over 20 hours.

The particles obtained had a surface area of 415 m²/g and a pore volume of 9.6 cm³/g determined by Hg intrusion porosimetry. The resulting particles are shown in FIG. 2.

Example 3

Preparation of Porous Silica Particles

Preparation of the aqueous phase: 15 g Inulin-polymer was dissolved in 1950 g water at room temperature. 1050 g ethylene glycol was added.

Preparation of the oily phase: 672 g Ethanol was added to 3120 g TES 40 together with 500 g polyethylene glycol MW 300 and stirred at room temperature. 144 mL 0.1N HCl was added to the mixture over a period of 10 minutes. The mixture was stirred for an additional 30 minutes at room temperature. The mixture was heated in an oil bath 30° C. and evacuated to 400 mbar for 150 minutes. After cooling to room temperature, 400 g of this oil was used in the subsequent steps.

Preparation of the emulsion: The aqueous phase and the oily phase were mixed for 4 minutes at room temperature and then stirred for another 30 minutes. The emulsion was then contacted with 40 mL 25% ammonium hydroxide.

Preparation of the xerogel: The particles were washed with water and heated to 150° C. and dried followed by heating to 650° C. with 1° C./min. and the calcinated at 650° C. for 6 hours. The particles were then cooled to 20° C. over 20 hours.

Figure 3:
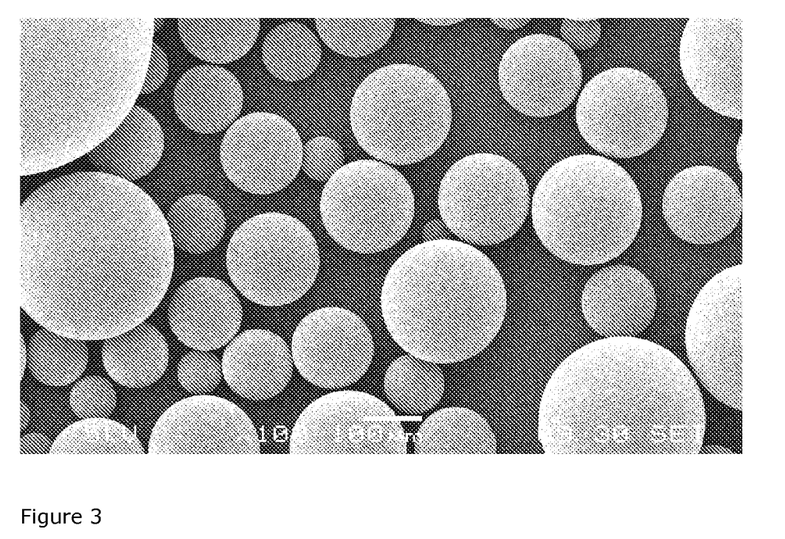
FIG. 3 shows the porous silica particles obtained in Example 3.

The particles obtained had a surface area of 351 m²/g and a pore volume of 0.54 cm³/g. The resulting particles are shown in FIG. 3

Example 4

Preparation of Porous Silica Particles

Preparation of the aqueous phase: Inulin-polymer was dissolved in water at room temperature according to Table 1. Isopropanol ("IPA") was added according to Table 1. Water phase additive was added according to Table 1.

Preparation of the oily phase: 672 g Ethanol was added to 3120 g TES 40 and stirred at room temperature. 146 mL 0.1N HCl was added to the mixture over a period of 10 minutes. The mixture was stirred for an additional 30 minutes. The mixture was heated in an oil bath (140° C.) and evacuated to 400 mbar for 150 minutes. After cooling to room temperature, 400 g of the oily phase was used in the preparation of the emulsion. Oil phase additive was added according to Table 1.

Preparation of the emulsion: The aqueous phase and the oily phase were mixed for 4 minutes at room temperature and the stirred for another 30 minutes at room temperature. The emulsion was then contacted with 40 mL 25% ammonium hydroxide. The mixture was stirred for another 30 minutes.

Preparation of the xerogel: The particles were washed with water and heated to 150° C. and dried followed by heating to 650° C. with 1° C./min. and then calcinated at 650° C. for 6 hours. The particles were then cooled to 20° C. over 20 hours.

TABLE 1

| | SP1 added | Water phase | Water phase additive | Oil phase additive | Surface areal m²/g | Pore volume cm³/g |
|---|---|---|---|---|---|---|
| A | 23 g | 3000 g | 40 g Lutensol TO2 | | 402 | 1.03 |
| B | 30 g | 3000 g | 40 g Lutensol XP30 | | 404 | 0.91 |
| C | 15 g | 3000 g | 5 g Berol 535 | 30 g 1-Hexanol 30 g Diethylene glycol butyl ether | 389 | 0.85 |
| D | 15 g | 3000 g | | 40 g Propylene glycol propyl ether | 284 | 0.62 |
| E | 15 g | 3000 g containing 10% IPA | | 40 g 1-methoxy-2-propanol | 326 | 0.76 |
| F | 15 g | 3000 g containing 12.5% IPA | | 30 g 1,3-Propandiol | 249 | 0.64 |
| G | 15 g | 3000 g containing 12.5% IPA | | 30 g 1,10-Decandiol | 297 | 0.88 |

Example 5

Preparation of Porous Silica Particles without Insulin (Reference Example)

Preparation of the aqueous phase: 605 g isopropanol is added to 1057 g water at room temperature.

Preparation of the oily phase: 672 g Ethanol was added to 3120 g TES 40 and stirred at room temperature. 144 mL 0.1N HCl was added to the mixture over a period of 10 minutes. The mixture was stirred for an additional 30 minutes at room temperature. The mixture was heated in an oil bath 140° C. and evacuated to 400 mbar for 180 minutes. After cooling to room temperature, 400 g of the oily phase was used in the subsequent steps, Preparation of the emulsion: The aqueous phase and the oily phase were mixed for 5 minutes at room temperature and then stirred for another 30 minutes. The emulsion was then contacted with 40 mL 25% ammonium hydroxide.

Preparation of the xerogel: The particles were washed with water and heated to 150° C. and dried followed by heating to 650° C. with 1° C./min and the calcinated at 650° C. for 6 hours. The particles were then cooled to 20° C. over 20 hours.

Figure 4:
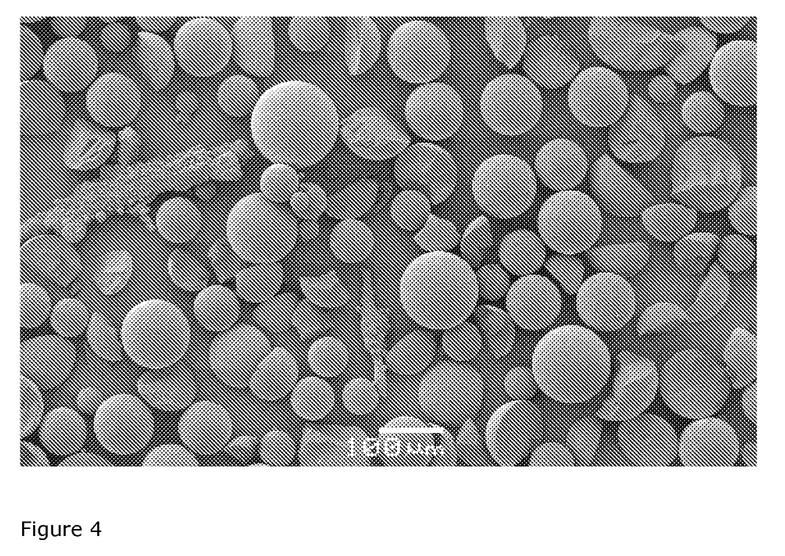
FIG. 4 shows the porous silica particles obtained in Example 5.

The particles obtained had a surface area of 361 m²/g and a pore volume of 1.27 cm³/g. The resulting particles are shown in FIG. 4. A significant number of the particles were broken.

Example 6

Preparation of Porous Silica Particles without Insulin (Reference Example)

Preparation of the aqueous phase: 1080 g isopropanol is added to 1900 g water together with 20 g Span 80 at room temperature.

Preparation of the oily phase: 672 g Ethanol was added to 3120 g TES 40 and stirred at room temperature. 144 mL 0.1N HCl was added to the mixture over a period of 10 minutes. The mixture was stirred for an additional 30 minutes at room temperature. The mixture was heated in an oil bath 140° C. and evacuated to 400 mbar for 360 minutes. After cooling to room temperature, 20 g Tween 20 was added to 380 g of this oil and this oil phase was used in the subsequent steps.

Preparation of the emulsion: The aqueous phase and the oily phase were mixed for 5 minutes at room temperature and then stirred for another 30 minutes. The emulsion was then contacted with 40 mL 25% ammonium hydroxide.

Preparation of the xerogel: The particles were washed with water and heated to 150° C. and dried followed by heating to 650° C. with 1° C./min and the calcinated at 650° C. for 6 hours. The particles were then cooled to 20° C. over 20 hours.

Figure 5:
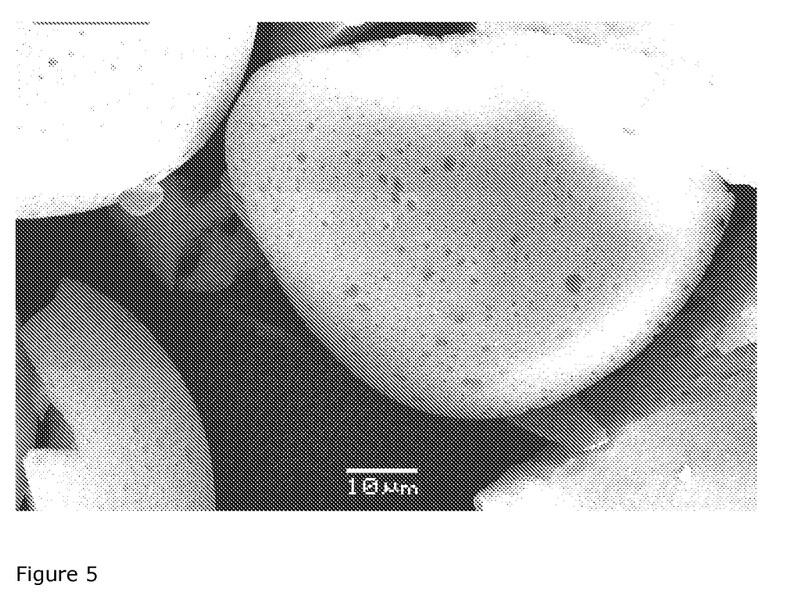
FIG. 5 shows the porous silica particles obtained in Example 6.

The particles obtained had a surface area of 304 m²/g and a pore volume of 0.73 cm³/g. The resulting particles are shown in FIG. 5. A significant number of the particles were irregular in shape or were broken.

Example 7

Preparation of Porous Silica Particles with Increased Surface Roughness

Preparation of the aqueous phase: 30 g Insulin-polymer was dissolved in 3000 g water at room temperature.

Preparation of the oily phase: 672 g Ethanol was added to 3120 g TES 40 and stirred at room temperature. 146 mL 0.1N HCl was added to the mixture over a period of 10 minutes. The mixture was stirred for an additional 30 minutes. The mixture was heated in an oil bath (140° C.) and evacuated to 400 mbar for 150 minutes. After cooling to room temperature, 240 g of the oil was mixed with 160 g TES 40 and used in the subsequent steps.

Preparation of the emulsion: The aqueous phase and the oily phase were mixed for 4 minutes at room temperature and the stirred for another 30 minutes at room temperature. The emulsion was then contacted with 40 mL 25% ammonium hydroxide. The mixture was stirred for another 30 minutes.

Preparation of the xerogel: The particles were washed with water and heated to 150° C. and dried followed by heating to 650° C. with 1° C./min. and then calcinated at 650° C. for 6 hours. The particles were then cooled to 20° C. over 20 hours.

The particles obtained had an average pore size of 102 Ångstrøm, a surface area of 380 m²/g measured by nitrogen adsorption, and a pore volume of 0.98 cm³/g. The resulting particles are shown in FIG. 6. The mean surface roughness was 0.557 μm, cf. FIG. 7.

Example 8

Preparation of Porous Silica Particles with Increased Surface Roughness

Preparation of the aqueous phase: 30 g Inulin-polymer was dissolved in 3000 g water at room temperature.

Preparation of the oily phase: 672 g Ethanol was added to 3120 g TES 40 and stirred at room temperature. 146 mL 0.1N HCl was added to the mixture over a period of 10 minutes. The mixture was stirred for an additional 30 minutes. The mixture was heated in an oil bath (140° C.) and evacuated to 400 mbar for 150 minutes. After cooling to room temperature, 360 g of the oil was mixed with 40 g cyclohexanol and used in the subsequent steps.

Preparation of the emulsion: The aqueous phase and the oily phase were mixed for 4 minutes at room temperature and the stirred for another 30 minutes at room temperature. The emulsion was then contacted with 40 mL 25% ammonium hydroxide. The mixture was stirred for another 30 minutes.

Preparation of the xerogel: The particles were washed with water and heated to 150° C. and dried followed by heating to 650° C. with 1° C./min. and then calcinated at 650° C. for 6 hours. The particles were then cooled to 20° C. over 20 hours.

The particles obtained had an average pore size of 102 Ångstrøm, a surface area of 380 m²/g measured by nitrogen adsorption, and a pore volume of 0.98 cm³/g. The resulting particles are shown in FIG. 8. The mean surface roughness was 0.153 μm.

The invention claimed is:

1. A process for preparing silica particles, said process comprising the steps of:
   mixing
   (i) an aqueous phase and
   (ii) an oily phase comprising pre-polymerized tetraalkoxy orthosilicate, one or more alcohols, and optionally one or more polyalkylene glycols;
   adding one or more bases under stirring;
   washing, heating, and drying the particles;
   wherein said aqueous phase comprises, in an aqueous solvent, one or more $C_{6-30}$-alkyl modified polysaccharides, and optionally one or more polyalkylene glycols.

2. The process according to claim 1, wherein $C_{6-30}$-alkyl modified polysaccharide is present in the aqueous phase in an amount of 0.01-10%(w/w).

3. The process according to claim 1, wherein (i) the aqueous phase and (ii) the oily phase are mixed in a weight ratio of from 10:1 to 1:2.5.

4. The process according to claim 1, wherein the modified polysaccharide is selected from inulin $C_{8-24}$-alkyl carbamates.

5. The process according to claim 1, wherein the aqueous phase is essentially devoid of N,N-dimethyl formamide.

6. The process according to claim 1, wherein the resulting silica particles are reacted with a silane of the formula $HSiR_2R^*$, wherein each of R independently is a $C_{1-4}$-alkyl group, and wherein $R^*$ is a $C_{4-30}$-alkyl group.

* * * * *